though sheeting or pressure rolls for cleaning the

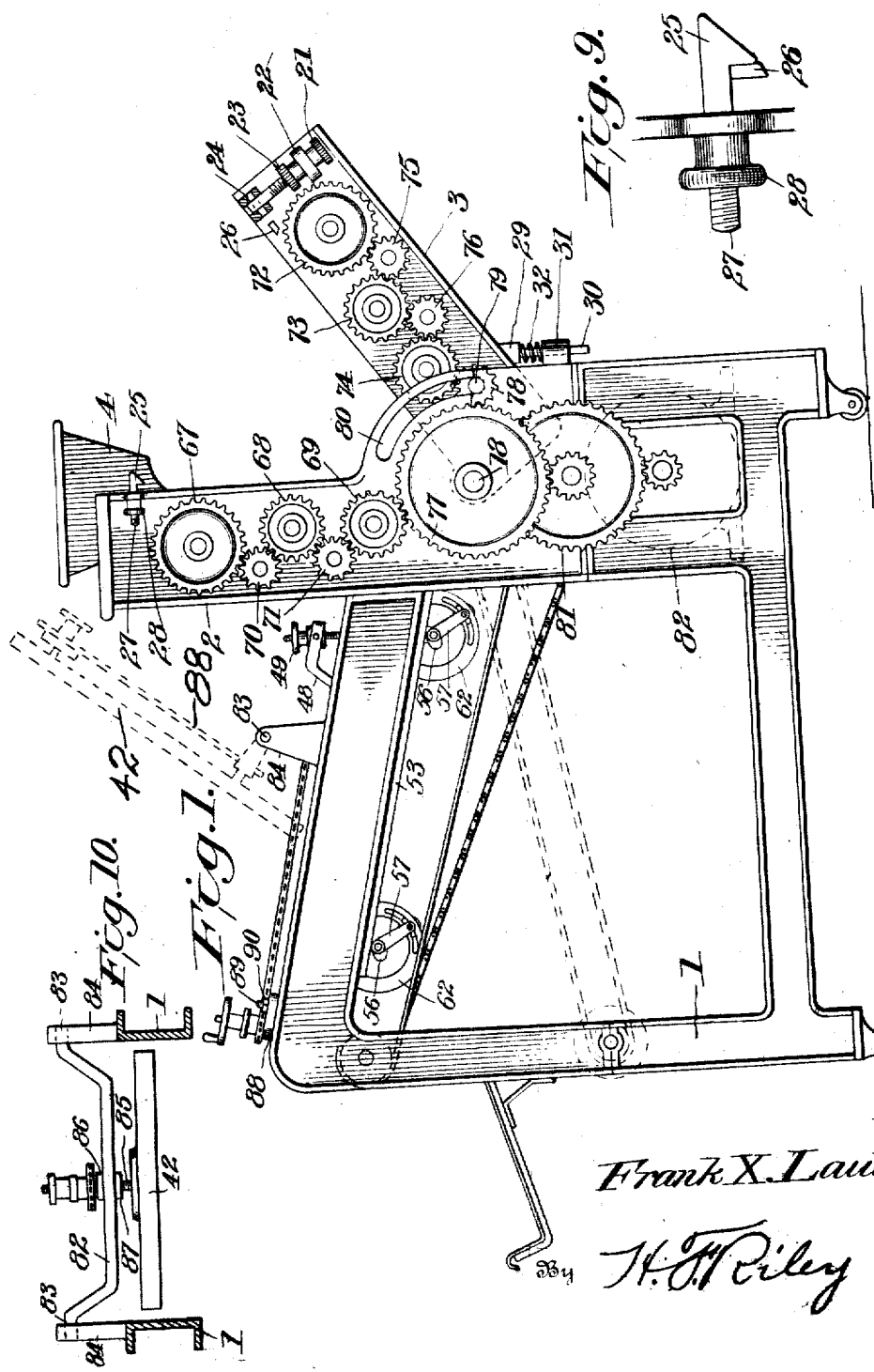

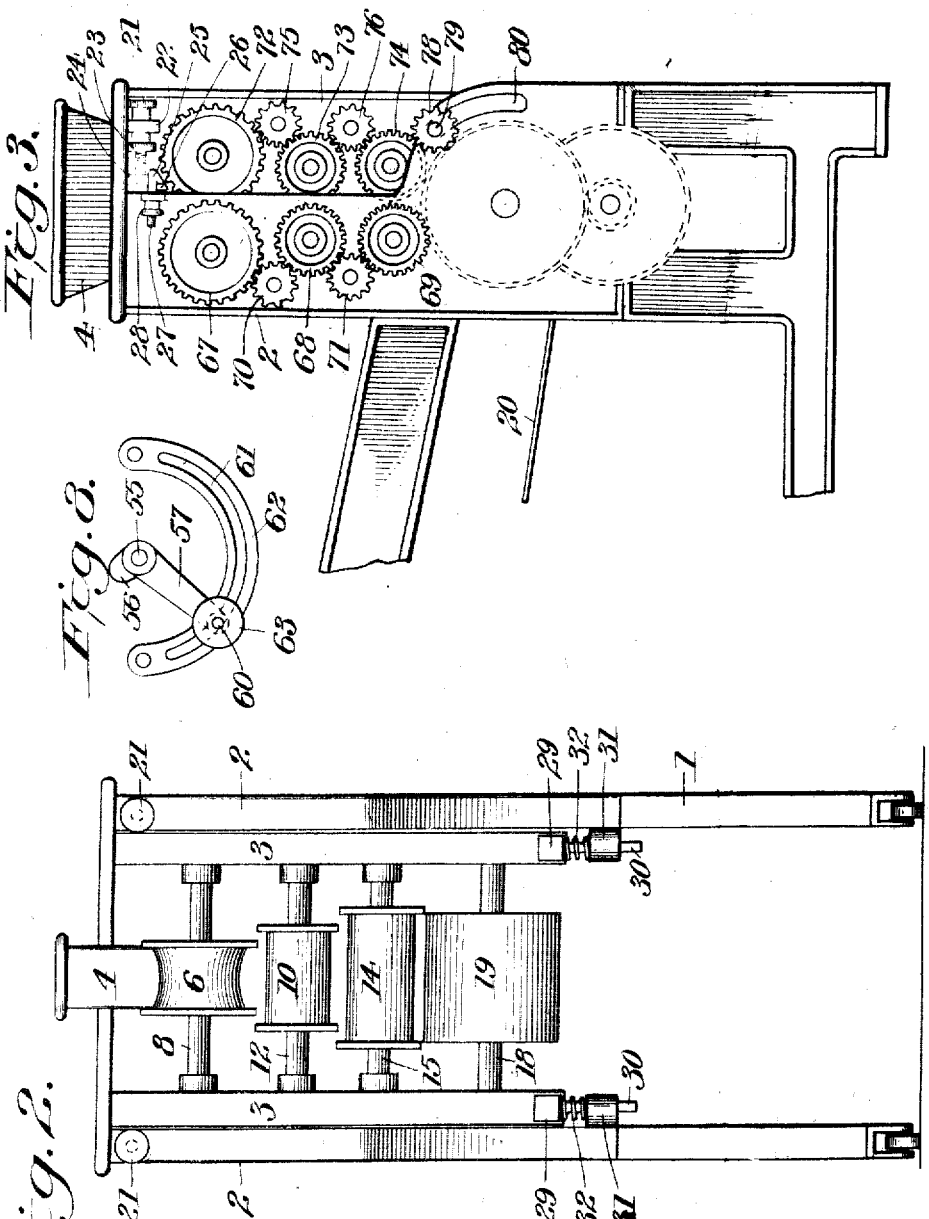

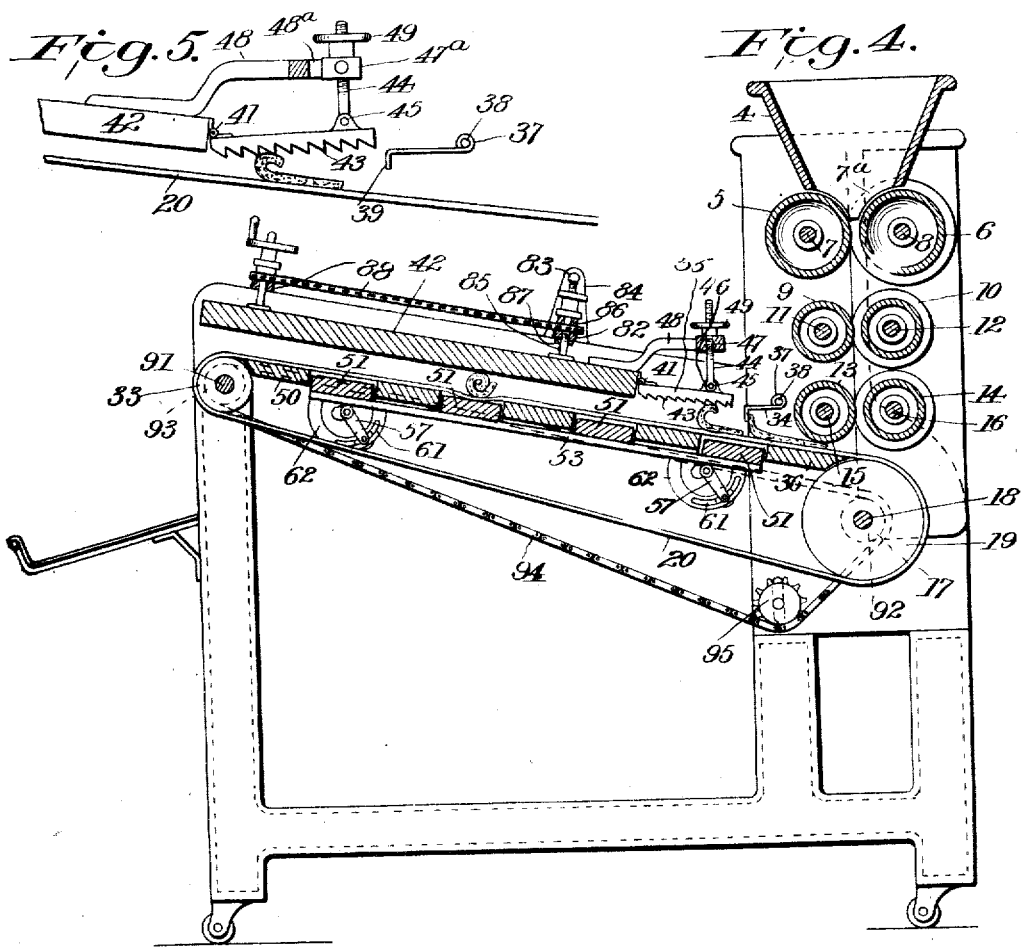
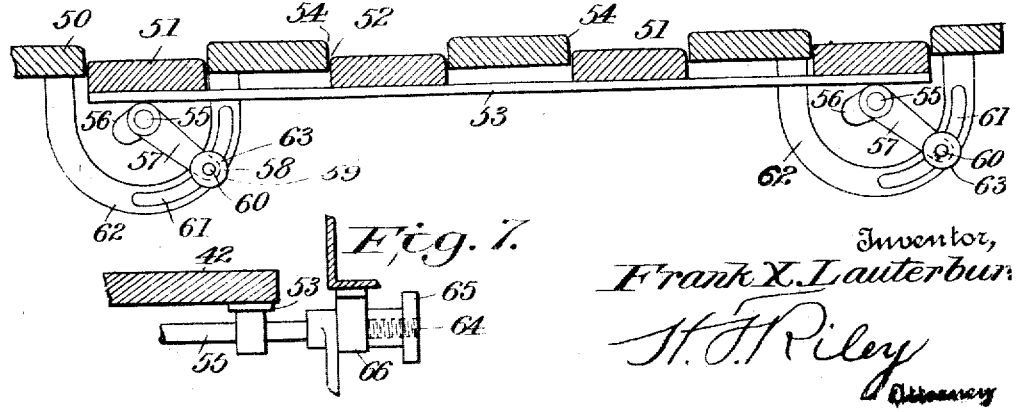

UNITED STATES PATENT OFFICE.

FRANK X. LAUTERBUR, OF SIDNEY, OHIO.

DOUGH-MOLDING MACHINE.

1,366,266.

Specification of Letters Patent.   Patented Jan. 18, 1921.

Application filed May 21, 1917.   Serial No. 170,105.

*To all whom it may concern:*

Be it known that I, FRANK X. LAUTERBUR, a citizen of the United States, residing at Sidney, in the county of Shelby and State of Ohio, have invented certain new and useful Improvements in Dough-Molding Machines, of which the following is a specification.

The invention relates to certain improvements in dough machines.

The object of the present invention is to improve the construction of dough molding machines, and to provide a simple, practical and efficient dough molding machine of strong, durable, and comparatively inexpensive construction, adapted to form a lump of dough into a thin sheet and simultaneously expel the gas therefrom, and then, without double seaming or mashing the front edge of the sheet, coil the latter into a spiral roll, and finally through kneading and pressure, mold the roll into a loaf of the desired size, without killing or punishing the dough through too great working or excessive pressure in the treatment of the same, so that the dough will rise in the pan and make a nice loaf of bread.

A further object of the invention is to simplify and improve the construction of the dough curling or coiling mechanism, and to provide positively operative dough curling devices adapted to engage first the front edge of the thin sheet of dough and fold or curl the same back upon itself to start the coiling operation, and then successively engage the curled portion of the dough and complete the coiling of the same in a manner closely analogous to hand coiling and with an accuracy and positiveness fully equal to hand coiling.

Another object of the invention is to provide a molding or shaping box equipped with adjustable kneading means constituting the bottom of the mold box and adapted to produce the desired amount of kneading action to suit the character of the dough and the requirements of the trade in various localities and capable also of entirely eliminating the kneading action so that the loaf may be molded or shaped under pressure in a molding box presenting a smooth bottom to the dough.

Furthermore, the invention has for its object to provide a dough molding machine adapted to be readily opened to expose and afford ready access to the feeding and the sheeting or pressure rolls for cleaning the same, adjusting means being also provided for properly spacing the rolls to produce the desired pressure upon the dough.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:—

Figure 1 is a side elevation of a dough-molding machine constructed in accordance with this invention, the hinged frame section which carries the outer feeding and sheeting or pressure rolls being swung downward.

Fig. 2 is an end view showing the arrangement of the hopper, the feeding and sheeting or pressure rolls and the endless conveyer.

Fig. 3 is a partial side elevation of the machine, the hinged frame section being closed.

Fig. 4 is a longitudinal sectional view of the dough molding machine.

Fig. 5 is an enlarged detailed sectional view of the dough curling and coiling devices.

Fig. 6 is an enlarged detail view, partly in section, illustrating the construction of the adjustable bottom of the molding or shaping box.

Fig. 7 is a detail transverse sectional view of the same.

Fig. 8 is a detail view of the locking means for securing the bottom of the molding or shaping box in its adjustment.

Fig. 9 is a detail view of the locking device for securing the hinged section of the frame in its closed position.

Fig. 10 is a detail transverse sectional view illustrating the manner of pivotally mounting the pressure board.

Like numerals of reference designate corresponding parts in all the figures of the drawings.

In the accompanying drawings, in which is illustrated the preferred embodiment of the invention, the main frame of the dough molding machine is composed of spaced sides 1 connected by suitable transverse frame members and provided at one end with vertical columns 2 and having a hinged outer section 3 carrying the outer rolls hereinafter described and adapted to swing downwardly and outwardly to the open position illustrated in Fig. 1 of the drawings to afford access to the dough feeding and sheeting or pressure rolls. This construction is particularly advantageous as it will enable scrapers to be readily employed in connection with any of the rolls when desired and will permit an easy cleaning of the dough engaging means.

The columns 2 of the frame support a hopper 4 and located directly beneath the hopper are inner and outer transverse feeding rolls 5 and 6 mounted respectively on the columns 2 and the hinged frame section 3 and adapted to operate on a lump of dough to flatten the same into a sheet and start the dough through the machine. The feeding rolls which are mounted on transverse shafts 7 and 8 are preferably concave as shown and the sides 7 of the hopper are preferably tapered and extended downwardly between the upper portions of the feeding rolls and present curved side edges to the same as clearly illustrated in Fig. 4 of the drawings. The outer roll is shown flanged and receives the inner roll between its flanges, but the flanges may of course be omitted if desired.

The flattened dough, which moves downwardly between the feed rolls 5 and 6, is caught between inner and outer intermediate transverse pressure or sheeting rolls 9 and 10 mounted on transverse shafts 11 and 12, which are journaled in suitable bearings of the columns 2 and the hinged frame section 3. The intermediate sheeting or pressure rolls 9 and 10 are of uniform diameter to present cylindrical surfaces to the sheet of dough, and the outer roll is shown flanged to receive the inner roll. The dough is formed into a thin sheet through the squeezing and rolling action of the said rolls 9 and 10 and the sheeting operation of the dough is completed by a pair of lower sheeting or pressure rolls 13 and 14 mounted on transverse shafts 15 and 16 which are journaled respectively on the columns 2 and the hinged frame section 3. As the sheet of dough passes downward between the sheeting or pressure rolls, it is reduced in thickness and increased in width and the rolls progressively increase in width downward to accommodate the increasing width of the sheet of dough. The lower rolls 13 and 14 are cylindrical and the outer roll 14 is flanged like the outer intermediate roll but the flanges are non-essential and in practice the size and number of the rolls may be varied.

The hinged frame section 3 is mounted at its lower end at 17 on a transverse shaft 18 of an inner roll 19 of an endless traveling conveyer 20 and it is equipped at its upper end with adjusting screws 21, threaded into lugs 22 of the frame section 3 and carrying lock nuts 23 and provided at their inner ends with engaging portions or heads 24, which are adapted to engage the columns for limiting the closing movement of the hinged frame section 3 and the space between the inner and outer sets of rolls. Their adjustment enables the rolls to be set the proper distance apart to suit the character of the dough and produce the desired thickness of the sheet delivered to the endless conveyer.

The hinged frame section 3 is secured to the frame 2 in its closed position by locking devices 25, consisting of catches mounted on one of such parts and engaging lugs 26 of the other of such parts. The catches, which have beveled heads to enable them to automatically engage the lugs 26, are provided with threaded shanks 27 and adjusting nuts 28 to enable them to be adjusted to suit the adjustment of the hinged section 3 through the adjusting screws. Various other means, however, may be provided for adjusting the rolls and for securing the hinged frame section 3 in its closed position, and while the locking devices are shown mounted on the columns in the accompanying drawings, the parts may be reversed and the locking devices arranged on the hinged frame section 3.

The frame is provided at opposite sides with buffers 29, arranged to receive and cushion the hinged section 3 when the same is swung downward to its open position. The buffers 29 are provided with shanks 30, mounted in lugs 31 and having disposed on them coiled springs 32, which are interposed between the buffers 29 and the lugs 31. The buffers 29 limit the downward swing of the frame section and support the same in its open position.

The traveling endless conveyer 20, which may be constructed of canvas or other suitable material, extends longitudinally of the machine at an inclination and it passes around an outer transverse roll 33. The sheet of dough from the lower pressure or sheeting rolls 13 and 14 is delivered on to the upper flight of the endless conveyer and is advanced by the same to the curling and coiling mechanism which comprises a curling device 34 and a coiling device 35, located above a smooth inner extended end portion 36 of the bottom of the molding or shaping box of the machine. The front curling device 34, which extends transversely of the machine, consists of a plate of sheet metal or other suitable material having its upper edge rolled to form an eye 37 for the reception of a transverse pivot or pintle 38, which hinges the front curling device at the front end of the molding or shaping box. The lower edge of the curler 34 is bent forwardly at right angles to provide a dough engaging flange 39, and when the curler is not in engagement with the dough it hangs in a vertical position with the said flange in close proximity to the endless conveyer and in the path of the sheets of dough, and as a sheet is advanced on the bottom of the molding or shaping box by the endless conveyer, the flange engages the front edge of the sheet of dough, in a manner closely analogous to the fingers of the hand, and curls the engaged edge of the sheet carrying the edge of the dough upwardly and backwardly over the advancing sheet in substantially the arc of a circle. In this curling operation the curler 34 swings freely upwardly in the direction of the movement of the sheet and when the curler 34 reaches substantially a horizontal position the flange operates to pull the edge of the dough back and turn it down on itself, making a perfect curl of the dough without mashing or double seaming. The curler 34 which automatically disengages itself and swings back to its initial position, may be provided at its back with a weight, when it is constructed of sheet metal, but it may be made of any other suitable material. The coiling of the sheet of dough into a spiral roll is completed by the coiling device 35, consisting of a rectangular plate, hinged at 41 at one of its transverse edges to the inner end of the top wall or pressure board 42 of the molding or shaping box and arranged above the extended inner end of the bottom of the molding box at a slight inclination with respect to the same and extending upwardly in the direction of the movement of the dough, so as to effect a positive engagement with the same. The coiling device 35 is provided at its lower face with transverse ribs 43 shouldered at their front edges and presenting inclined lower faces and forming relatively sharp transversely disposed dough engaging edges. The series of ribs extend from the hinged edge to the front or free edge of the coiling device and the coil of the sheet of dough passing beneath the coiling device 35 is successively engaged by the transverse ribs and is in continuous engagement with the coiling device and the sheet of dough is positively and accurately coiled in a manner similar to hand coiling by the successive engagement of the ribs throughout the lower face of the coiling device.

The dough is subjected in passing under the coiling device to sufficient pressure to render the engagement positive and the coiling device is adjustably supported in proper position with relation to the bottom of the molding box by an adjusting screw 44 pivoted at 45 to an ear 46 of the upper face of the coiling device and extending upwardly therefrom and passing through an opening 47 of a transverse pivot 47ª which is mounted in a fork or bifurcation 48ª of an arm 48. The screw 44 is provided with an adjusting nut 49 arranged upon the pivot 47ª and adapted to be rotated to raise and lower the coiling device for supporting the same at the desired elevation. The pivotal mounting of the screw 44 and the hinging of the lower end of the same to the coiling device relieves the screw of all strain incident to the adjustment of the said coiling device and enables it to accommodate itself to the adjustment of the said device. This construction provides a simple, practical and efficient means for adjusting the coiling device.

The bottom of the molding box is composed of a plurality of fixed sections 50 spaced apart to receive adjustable sections 51 movable upwardly and downwardly in the spaces 52, between the fixed sections 50 and connected by longitudinal bars 53 so as to move in unison. The upward and downward adjustment of the movable sections 51 increase and diminish the undulatory or wavy character of the kneading surface presented to the dough by the bottom of the molding box and the upper flight of the endless conveyer is sufficiently slack to permit it to sink into the pockets or depressions of the kneading surface and present a sinuous or serpentine contour composed of alternate substantially convex and concave portions over which the rolls of coiled dough are carried. By kneading the dough in this manner it may be formed or molded into a loaf of the desired size and shape without the necessity of subjecting it to excessive pressure and the treatment of the dough is such that it is not killed or punished and will rise in the pan and make a nice loaf possessing all the advantages of a hand made loaf, but superior to the same owing to its uniformity in size, shape and texture. The adjustment of the movable sections 51 will enable the degree or extent of the serpentine contour to be varied to suit the character of the dough and to secure the desired kneading action. The roll of dough is widened out during its passage over the kneading surface to form a loaf of a length corresponding to the width of the molding or shaping box, and the inner faces of the sides of the kneading box are smooth to buff or finish the ends of the loaf. The upper edges 54 of the fixed sections are preferably rounded as shown, in Fig. 6, while the upper corners of the adjustable sections may be rounded or not, and the adjustment of the sections 51 is effected by means of transverse shafts 55 journaled in suitable bearings of the frame and provided with cams 56 arranged beneath and supporting the connecting bars 53. The shafts 55 which are located at the ends of the connecting bars 53 are capable of independent adjustment as well as simultaneous adjustment to raise or lower either or both ends of the connecting bars so that a uniform kneading surface of the desired degree may be had or a kneading surface varying in degree throughout its length may be formed. This will enable the dough to be subjected to a uniform kneading action during its passage through the molding box or to a kneading action which may either increase or decrease with the passage of the dough through the machine. The shafts 55 are provided with depending arms 57 forming handles for adjusting the cams or eccentrics 56 and secured in their adjustment by means of clamping nuts 59 mounted on screws 60 operating in arcuate slots 61 of plates 62 but the slots may be formed in the frame of the machine or otherwise if desired. The shafts are also provided with threaded terminals 64 having clamping nuts 65 for engaging the bearings 66 in which the shafts 55 are mounted.

The shafts of the inner set of rolls have mounted on them gears 67, 68 and 69, which mesh with pinions 70 and 71 and the shafts of the outer set of rolls carry gears 72, 73 and 74 which mesh with pinions 75 and 76. The gear wheel 69 also meshes with a gear wheel 77 mounted on the shaft 18 of the inner roll and connected by a pinion 78 with the gears of the outer set of rolls. The pinion 75 is mounted on a shaft 79 which operates in an arcuate slot 80 of the columns when the hinged frame section swings upwardly and downwardly. The gear wheel 77 is connected by a train of gears 81 with a motor 82. Any other suitable arrangement of gearing may be employed for transmitting motion from the motor or other source of power to the inner and outer rolls and the conveyer. The shaft 79 carries a gear or pinion which meshes with the gear 74.

The pressure board 42 is connected at its inner end with a yoke 82 disposed transversely of the frame and having terminal horizontally alined pivots 83 which are mounted in suitable bearings of arms 84 extending upwardly from the upper edges of the inclined top portions of the sides of the main frame. The pressure board which is inclined and arranged in spaced relation with the kneading surface of the molding box is connected with the center of the yoke by a screw 85 carrying upper and lower nuts 86 and 87 and piercing the said yoke. The outer or upper end of the pressure board is supported by a transverse bar 88 detachably clamped upon the sides 1 of the frame by screws 89 and nuts 90 which permit the upper end of the pressure board to be detached from the frame to enable the pressure board to be swung upwardly and inwardly to expose the same and the interior of the molding box when it is desired to obtain access to the same for cleaning or other purpose. When it is desired to swing the pressure board 42 upward the coiling device 35 and the bracket 48 are removed to permit the upward swinging of the said pressure board.

The shaft 18 of the inner roll 17 and the shaft 91 of the outer roll 33, of the endless conveyer are provided with sprocket gears 92 and 93 which mesh with a sprocket chain 94 extending beneath a tensioning sprocket wheel 95 and connected with the motor through the shaft 18 to provide an independent chain drive to both the front and rear rolls.

What I claim is:—

1. A dough molding machine including a frame provided with a hinged section located at the end of the machine and arranged to swing outwardly to a projecting position beyond the machine to open the frame and expose the machine for cleaning, and inner and outer rolls mounted respectively on the frame and the hinged section and adapted to be exposed by the outward swinging of the hinged frame.

2. A dough molding machine including a frame provided with vertical columns and having a vertical section located at the columns and arranged at one end of the machine and hinged at the lower end at a point intermediate of the top and bottom of the machine and arranged to swing outwardly beyond the machine into a projecting position to open the frame and expose the machine for cleaning, and inner and outer rolls mounted on the columns and the hinged section respectively and exposed by the outward swinging of the said hinged section.

3. A dough molding machine including a frame, a substantially vertical frame section located at one end of the machine and hinged at the bottom and arranged to swing outwardly and downwardly to a projecting inclined position entirely clear of the machine, inner and outer rolls mounted respectively on the frame and hinged section, and locking means for securing the hinged section in its closed position.

4. A dough molding machine including a frame, a substantially vertical frame section located at the end of the machine and hinged at the bottom and arranged to swing downwardly and outwardly to a position entirely clear of the frame of the machine to open the latter and expose the parts thereof for cleaning, inner and outer rolls mounted respectively on the frame and the hinged section, and locking means including a catch having a threaded shank, and an adjusting nut mounted on the threaded shank for adjusting the position of the catch for securing the hinged section in an adjusted position.

5. A dough molding machine including a frame, a substantially vertical frame section hinged at the lower end and located at the end of the machine in position to swing outwardly entirely clear of the frame of the machine, inner and outer rolls mounted respectively on the frame and the hinged section and exposed by the opening of the said hinged section, adjusting means for limiting the closing movement of the hinged section to vary the distance between the inner and outer rolls, and means for securing the hinged section in its closed position.

6. A dough molding machine including a frame, a substantially vertical frame section located at one end of the machine and arranged to swing downwardly and outwardly entirely clear of the machine into a projecting position, inner and outer rolls mounted respectively on the frame and the hinged section, adjustable means for limiting the closing movement of the hinged section to vary the distance between the inner and outer rolls, and means for locking the hinged section in its closed position, said locking means being adjustable to correspond with the adjustment of the hinged section.

7. A dough molding machine including a frame, a substantially vertical frame section located at one end of the machine and hinged at the bottom and arranged to swing downwardly and outwardly into a projecting position entirely clear of the machine to open the frame, inner and outer rolls mounted respectively on the frame and the hinged section, an adjusting screw mounted on the hinged section and arranged to engage the frame for limiting the closing movement of the said hinged section to vary the space between the inner and outer rolls, a lock nut carried by the adjusting screw, and a locking device for securing the hinged frame in its closed position, said locking device comprising a catch having a threaded shank and mounted for longitudinal adjustment, an adjusting nut mounted on the threaded shank, and a lug coöperating with and adapted to be engaged by the catch.

8. A dough molding machine including a frame having spaced columns provided with an arcuate slot, an inner set of rolls mounted on the columns, gears connecting the rolls, an endless conveyer mounted on the frame and having a shaft extending across the space between the columns, a gear mounted on said shaft and meshing with one of said gears, a hinged frame section arranged to swing on the said shaft and located at one end of the machine and arranged to swing downwardly and outwardly to a projecting position clear of the machine, an outer set of rolls carried by the hinged frame section, gearing connecting the outer rolls, and a gear meshing with the gear of the said shaft and having a shaft operating in the said arcuate slot and connected with the gearing of the outer rolls.

9. A dough molding machine including a frame having spaced vertical columns, a hopper supported by the columns, a frame section hinged at the bottom and arranged to swing outwardly and inwardly from a position beneath the hopper to a projecting position entirely clear of the machine, and inner and outer rolls mounted respectively on the columns and the hinged frame section and exposed by the outward swinging of the hinged section.

10. A dough molding machine including a frame having a hopper, a hinged section located beneath the hopper and arranged to swing inwardly and outwardly and movable to a projecting position beyond the hopper and entirely clear of the frame of the machine, inner and outer rolls carried by the frame and the hinged section, and an exterior buffer mounted on the frame and arranged to receive and support the hinged section in its projecting open position.

11. A dough molding machine including a frame having spaced columns provided with projecting supporting portions, a frame section hinged between the columns and arranged at one end of the machine in position to swing downwardly and outwardly into a projecting position clear of the machine, inner and outer rolls mounted on the columns and the frame section, exterior buffers arranged to receive and support the frame section when the latter is swung downwardly into a projecting open position, said buffers having shanks slidable in said projecting supporting portions of the frame, and coiled springs mounted on the shanks to cushion the buffers.

12. A dough molding machine including a molding box having a top pressure board means for curling the edge of a sheet of dough passing through the machine, and a coiling device consisting of an overhead plate hinged to and forming an extension of the said pressure board provided on its under side with a series of transverse ribs arranged to successively engage the curled portion of the sheet of dough to completely coil the same as the dough is advanced through the machine, said plate being hinged at one end and arranged to be adjusted upwardly and downwardly, and adjusting means comprising a fixed member carried by the pressure board and located above the plate, a screw pivotally connected to the plate and extending upwardly therefrom, and means for adjustably connecting the screw with the said fixed member for controlling relative position of the said plate, said adjusting means comprising a transverse pivot mounted on the fixed member and having an opening receiving the screw and a nut loosely seated upon the said pivot and engaging the threads of the screw.

13. A dough molding machine including a molding box provided with a pressure board, a traveling endless conveyer passing through the molding box beneath the pressure board, means for curling the edge of a sheet of dough, and a coiling device consisting of a plate hinged to and extending inwardly from the inner end of the pressure board and forming a continuation and carried by and adjustable with respect to said pressure board and provided at its under side with means for successively engaging the curled portion of the dough to coil the sheet.

14. A dough molding machine including a molding box provided with a pressure board, a traveling endless conveyer passing through the molding box beneath the pressure board, means for curling the edge of a sheet of dough, and a coiling device consisting of a plate hinged to and extending inwardly from the pressure board and carried by and adjustable with respect to said pressure board and provided at its under side with means for successively engaging the curled portion of the dough to coil the sheet, and means carried by the pressure board and connected with the plate for adjusting the same toward and from the conveyer and for permitting a free upward movement of the plate.

15. A dough molding machine including a molding box having a continuous rigid bottom provided with adjustable sections arranged transversely to the longitudinal extent of the molding box to vary the kneading action, and a flexible member supported by the bottom of the molding box.

16. A dough molding machine including a molding box having a rigid bottom provided at intervals with sections adjustable upwardly and downwardly to vary the kneading action and to present a smooth surface, means for securing the sections rigidly in their adjustment, and a flexible member supported by the bottom of the molding box.

17. A dough molding machine including a molding box having a bottom composed of spaced relatively fixed sections, and relatively adjustable sections operating in the spaces between the fixed sections to vary the kneading action of the molding box, said fixed and adjustable sections being arranged transversely to the longitudinal extent of the molding box.

18. A dough molding machine including a molding box having a bottom composed of spaced relatively fixed sections, and relatively adjustable sections operating in the spaces between the fixed sections to vary the kneading action of the molding box, and an endless conveyer having a flexible flight traveling over the bottom of the molding box and coöperating therewith to form either a smooth or an undulatory or wavy kneading surface, said fixed and adjustable sections being arranged transversely to the longitudinal extent of the molding box.

19. A dough molding machine including a molding box having a bottom composed of spaced relatively fixed sections, and relatively adjustable sections operating in the spaces between the fixed sections to vary the kneading action of the molding box, and an endless conveyer having a flexible flight traveling over the bottom of the molding box and coöperating therewith to form either a smooth or an undulatory or wavy kneading surface, the upper corners of the fixed sections of the bottom of the molding box being rounded, said fixed and adjustable sections being arranged transversely to the longitudinal extent of the molding box.

20. A dough molding machine including a molding box provided with a bottom comprising fixed transverse sections spaced apart and a plurality of adjustable sections arranged transversely to the longitudinal extent of the molding box and operating in spaces between the fixed sections and movable upwardly and downwardly to form an adjustable undulatory kneading surface, and means for adjusting the movable sections and for supporting the same in their adjusted position.

21. A dough molding machine including a molding box provided with a bottom comprising fixed transverse sections spaced apart and a plurality of adjustable sections arranged transversely to the longitudinal extent of the molding box and operating in spaces between the fixed sections and movable upwardly and downwardly to form an adjustable undulatory kneading surface, and means for adjusting the movable sections and for supporting the same in their adjusted position, said means consisting of transverse shafts provided with cams located beneath and receiving the adjustable sections.

22. A dough molding machine including a molding box provided with a bottom comprising fixed transverse sections spaced apart and a plurality of adjustable sections disposed transversely to the longitudinal extent of the molding box and movable upwardly and downwardly to form an adjustable undulatory kneading surface, and means for adjusting the movable sections and for supporting the same in their adjusted position, said means consisting of transverse shafts provided with cams located beneath and receiving the adjustable sections, arms depending from the shafts, and locking means for securing the arms in their adjustment.

23. A dough molding machine including a molding box provided with a bottom comprising fixed transverse sections spaced apart and a plurality of adjustable sections disposed transversely to the longitudinal extent of the molding box and operating in spaces between the fixed sections and movable upwardly and downwardly to form an adjustable undulatory kneading surface, and means for adjusting the movable sections and for supporting the same in their adjusted position, said means consisting of transverse shafts provided with cams located beneath and receiving the adjustable sections, arms depending from the shafts, fixed plates having arcuate slots concentric with the shafts, screws mounted on the said arms and operating in the slots of the plates, and clamping nuts mounted on the screws and engaging plates.

24. A dough molding machine including a molding box provided with a bottom comprising fixed transverse sections spaced apart and a plurality of adjustable sections disposed transversely to the longitudinal extent of the molding box and operating in spaces between the fixed sections and movable upwardly and downwardly to form an adjustable undulatory kneading surface, and means for adjusting the movable sections and for supporting the same in their adjusted position, said means consisting of transverse shafts provided with cams located beneath and receiving the adjustable sections, arms depending from the shafts, and clamping means at the ends of the shafts for locking the same.

25. A dough molding machine including a molding box having a bottom composed of a plurality of spaced transverse fixed sections, a plurality of adjustable sections disposed transversely to the longitudinal extent of the molding box and movable upwardly and downwardly between the fixed sections, longitudinal bars secured to the adjustable sections at the lower faces thereof, and adjusting means engaging the connecting bars and supporting the same and the sections carried thereby.

26. A dough molding machine including a molding box having an adjustable top pressure board, means for curling the edge of a sheet of dough passing through the machine, and a coiling device consisting of an overhead plate provided on its under side with a series of transverse ribs arranged to successively engage the curled portion of the sheet of dough to completely coil the same as the dough is advanced through the machine, said plate being hinged at one end to the top pressure board and forming a continuation of the same and carried by the latter in the adjustments thereof and arranged to be adjusted upwardly and downwardly, and adjusting means also carried by the top pressure board comprising a fixed member located above the plate, a screw pivotally connected to the plate and extending upwardly therefrom and pivotally and adjustably connected with the fixed member, said screw having a free upward sliding movement from its adjusted position under the action of the dough.

27. A dough molding machine including a molding box having an adjustable top pressure board, means for curling the edge of a sheet of dough passing through the machine, and a coiling device consisting of an overhead plate provided on its underside with a series of transverse ribs arranged to successively engage the curled portion of the sheet of dough to completely coil the same as the dough is advanced through the machine, said plate being hinged at one end to the top pressure board and forming a continuation of the same and carried by the latter in the adjustments thereof and arranged to be adjusted upwardly and downwardly, and adjusting means also carried by the top pressure board comprising a fixed member located above the plate, a screw pivotally connected to the plate and extending upwardly therefrom, a transverse pivot carried by the fixed member and slidably receiving the said screw to permit free upward movement of the plate from its adjusted position, and a nut arranged upon the transverse pivot for adjustably securing the screw to the said pivot.

28. A dough molding machine including a molding box having an adjustable top pressure board, a coiling device consisting of an overhead plate provided on its under side with means for engaging a sheet of dough to coil the same as the dough is advanced through the machine, means for hinging the plate to one end of the top pressure board so as to form a continuation thereof, said hinging permitting the plate to be adjusted upwardly and downwardly, a relatively fixed member located above the plate and an upwardly extending member pivoted to the plate and pivotally and adjustably connected with the relatively fixed member, said upwardly extending member having a free upward movement from its adjusted position.

29. A dough molding machine including a molding box having an adjustable top pressure board, a coiling device consisting of an overhead plate located at one end of the top pressure board and forming a continuation thereof and carried by the said top pressure board in the adjustment of the latter provided on its under side with means for engaging a sheet of dough to coil the same as the dough is advanced through the machine, means for hinging the plate to permit the same to be adjusted upwardly and downwardly, a transverse pivot carried by the relatively fixed member, and an upwardly extending connecting member pivotally connected to the plate and slidable through and adjustably secured to the pivot and having a free upward movement from its adjusted position.

30. A dough molding machine including a molding box having a bottom and side walls, a pressure board extending longitudinally of the molding box and adjustable upwardly and downwardly, a curling device carried by the top pressure board in the adjustment thereof, a transverse member pivotally mounted on the side walls of and extending across the molding box and provided with adjusting means supporting one end of the pressure board to permit the same to swing upwardly and to raise and lower the said pressure board.

31. A dough molding machine including a molding box having a bottom and side walls, a pressure board extending longitudinally of the molding box and adjustable upwardly and downwardly, a curling device carried by the top pressure board in the adjustment thereof, arms extending upwardly from the side walls of the molding box, and an inverted pendent yoke pivoted at its ends to the said arms and having a centrally arranged adjusting device supporting one end of the pressure board to permit the same to swing upwardly out of the molding box and also to raise and lower the pressure board.

32. A dough molding box having a bottom composed of spaced relatively fixed sections, a series of relatively adjustable sections operating in the spaces between the fixed sections to vary the kneading action of the molding box, and means located at the ends of the series of adjustable sections for raising and lowering either or both ends of the series.

33. A dough molding box having a bottom composed of spaced relatively fixed sections, a series of relatively adjustable sections operating in the spaces between the fixed sections to vary the kneading action of the molding box, and independently adjustable cams located beneath and supporting the ends of the series of movable sections for raising and lowering the same.

34. A dough molding machine including a molding box having a top pressure board, a hinged coiling device consisting of an overhead plate connected at one end to the adjustable pressure board and forming a continuation thereof and carried by the same in the adjustment of the pressure board provided on its under side with means for engaging a sheet of dough for coiling the same, a forked arm extending over the said plate, a transverse pivot mounted between the sides of the fork of the arm and having a central opening, a connecting member slidable through the opening of the pivot and pivoted to the said plate, and means seated upon the transverse pivot for adjustably securing the member to the said transverse pivot and permitting free upward sliding movement from its adjusted position.

In testimony whereof I affix my signature in the presence of two witnesses.

FRANK X. LAUTERBUR.

Witnesses:
J. J. SAUER,
ROYON G. HESS.